United States Patent [19]

Sciulli et al.

[11] 3,927,268

[45] Dec. 16, 1975

[54] SPEECH PREDICTIVE ENCODING COMMUNICATION SYSTEM

[75] Inventors: Joseph A. Sciulli, Derwood; Samuel Joseph Campanella, Gaithersburg; Rene Costales, Rockville, all of Md.

[73] Assignee: Communications Satellite Corporation, Washington, D.C.

[22] Filed: Feb. 28, 1973

[21] Appl. No.: 336,589

Related U.S. Application Data

[63] Continuation of Ser. No. 139,106, April 30, 1971, abandoned.

[52] U.S. Cl. ...... 179/15 BW; 179/15 AP; 325/38 B

[51] Int. Cl. ........ H04j 3/04

[58] Field of Search...... 179/15 AP, 15 BA, 15 BW, 179/15 BY; 325/38 B

[56] References Cited

UNITED STATES PATENTS

| | | | |
|---|---|---|---|
| 3,447,147 | 5/1969 | Deregnaucourt | 179/15 BA |
| 3,588,364 | 6/1971 | Wallingford | 179/15 BW |
| 3,609,244 | 9/1971 | Mounts | 179/15 BW |
| 3,767,847 | 10/1973 | Haskell | 325/38 B |
| 3,769,453 | 10/1973 | Bahl | 179/15 BW |
| 3,772,458 | 11/1973 | May | 325/38 B |

*Primary Examiner*—Ralph D. Blakeslee
*Attorney, Agent, or Firm*—Alan J. Kasper; James W. Johnson, Jr.

[57] ABSTRACT

Bit rate compression in a digital communications system is provided by transmitting voice information from n telephone circuits over the capacity conventionally allocated for transmission of voice information from $n/2$ circuits without appreciable degradation in quality. Alternatively, a doubling of the number of voice circuits may be provided with transmission at the same bit rate required for conventional digital transmission of voice information. Each frame period, at the transmitter, all n circuits are serviced and, utilizing a predictive encoding scheme, only unpredictable samples in the given frame are transmitted over the available channel capacity. A sample assignment word (SAW), which identifies the circuits corresponding to the unpredictable samples, is transmitted therewith. Upon reception of the transmitted frame comprising the SAW and the unpredictable samples, the receiver updates the stored samples which were transmitted during previous frames as unpredictable samples by substituting the received unpredictable samples for the stored samples in accordance with the channel routing information provided by the SAW, thereby enabling proper reconstruction of all samples in the given frame. Means are provided for effectively recirculating the servicing sequence of the $n$ circuits to alleviate "overload". Means are also provided to insure proper reception of the SAW by the receiver.

16 Claims, 11 Drawing Figures

INVENTORS
JOSEPH A. SCIULLI
SAMUEL J. CAMPANELLA
RENE COSTALES

BY

ATTORNEY

TO COUNTER 25 (FIG. 5)

TO GATES 26, 26a (FIG. 5)

INPUT UNIT

SAW UNIT

SPEC RECEIVER

SPEECH PREDICTIVE ENCODING COMMUNICATION SYSTEM

This is a continuation of application Ser. No. 139,106, filed Apr. 30, 1971 now abandoned.

BACKGROUND OF THE INVENTION

1. Field of the Invention

This invention relates to multi-channel communications systems and, more particularly, to a redundancy removal scheme using predictive encoding of speech in a digital, multi-channel communications system for the purpose of bit rate reduction with no appreciable degradation in voice quality.

2. Description of the Prior Art

In communications systems using long and expensive transmission facilities, such as submarine cables and satellite communications systems, terminal facilities which insure optimum utilization of the transmission channels are very important. A well-known analog system, the Time Assignment Speech Interpolation (TASI) system achieves communications efficiency, i.e. bandwidth compression, by means of a transmission time savings. The TASI system takes advantage of the statistical fact that during a telephone conversation a one-way telecommunications channel is active only on the average of about 50 percent of the time. The TASI system monitors each voice circuit for voice activity and, in response to the detection of voice, connects a talker to an available channel. In this manner, a number of talkers greater than the number of available channels may be serviced by sharing the channels on a talkspurt interpolated basis.

The quality of speech transmitted by TASI is effected by three main sources of degradation. First, degradation occurs due to interpolation. If the number of talkers simultaneously talking in one direction exceeds the number of available channels a certain number of these talkers will be temporarily denied a channel. This condition is known as "freeze-out". The portion of speech not being transmitted by a talker who is temporarily frozen-out results in speech quality degradation. Second, degradation occurs due to the operation time of speech detectors, there being one speech detector for each voice circuit. Prior to connecting a voice circuit to an available channel the voice detector must detect speech activity in the voice circuit. During the time required for the voice detector to actually detect voice the talker's speech signals are lost causing further degradation of voice quality. Third, degradation is due to speech signals being lost during the time needed for switching and signaling functions to establish the proper connection between talker and listener once speech activity is detected by the voice detector.

There are many characteristics of the present invention which represent improvements over prior art systems. These improvements, while mentioned here, will become more readily apparent from the detailed discussion of the present invention. First, the present invention achieves bit rate reduction by accommodating the traffic of $n$ telephone circuits in the capacity of $n/2$ telephone channels with no noticeable degradation in received voice quality. Secondly, the present invention, being an all digital system, makes decisions on each voice circuit at the basic sampling rate. For this reason, the transmission of data within the voice band, which is a difficult task for TASI-like systems, is easily accommodated. Third, the present system employs a predictive encoding scheme which significantly reduces, by about 15 percent, the average activity factor (defined as the number of voice samples transmitted/the total number of voice samples) over prior systems without any appreciable loss in voice quality. Fourth, whereas the effect of freeze-out in TASI-like systems manifests itself as a "chopping" or "clipping" of the voice signal which can result in the loss of an entire syllable, the effect of "overload" (i.e. freezeout) in the present invention results only in an amplitude error (as opposed to a clip) in the received voice signal. In an overload condition the system does not really freeze-out samples from the voice circuits frozen-out since those circuits will have corresponding voice samples stored at the receiver whereby the receiver can reconstruct replicas of the frozen-out samples. Also, by means of a recirculation of the servicing sequence of n voice circuits the subjective effect of overload is substantially reduced. Fifth, the present invention utilizes a parity check scheme for protecting the transmitted voice samples thereby reducing the effect of errors (resulting in small amplitude error) caused by channel noice. Sixth, the present invention is built in a modular configuration (i.e., 64 circuits serviced by the transmission capacity conventionally allocated for transmission of digital voice information from 32 circuits to permit easy expansion to large capacities. Seventh, the flexibility of the present system allows transmission in either time division multiplexfrequency division multiple access (TDM-FDMA) or time division multiplex-time division multiple access (TDM-TDMA) systems. Eighth, the present invention can be used in a point to multipoint fashion in satellite communications. Any station can transmit voice information to several other stations while each of the other stations would use a receiver which only uses the specific voice circuits addressed to it. In this manner larger amounts of telephone traffic destined for multiple stations can be interpolated at the transmitter of a single station. Finally the implementation of the present invention will result in a lower cost per circuit as well as higher quality service than prior art systems such as TASI.

BRIEF SUMMARY OF THE INVENTION

In accordance with this invention bit rate compression in a digital, multi-channel, voice communications systems is accomplished while maintaining normal voice transmission quality. The system is designed to transmit all information from $n$ telephone circuits over the transmission capacity conventionally allocated for digital transmission of all voice information from $n/2$ circuits. All $n$ voice circuits are sampled at a rate, known as the frame rate, of one voice circuit every 125 $\mu$secs. Each voice sample in a frame period is compared at the transmitter with the corresponding voice sample of a previous frame stored in a predictive frame memory (PFM). If the comparison indicates that the present sample is predictable from the corresonding previous sample, a logic 0 is generated indicating that the present sample need not be transmitted. If the comparison indicates that the present sample is unpredictable from the corresponding previous sample then a logic 1 is generated indicating that the unpredictable sample should be transmitted.

Transmission of the unpredictable samples is accomplished in the following manner. A frame of information equivalent in bit rate to that required for conventional digital transmission of all voice information from $n/2$ voice circuits comprises the essential information and is formed at the transmitter. Assuming $n = 64$ the transmission frame comprises 24, 8 bit time slots $T_1$ thru $T_{24}$ designated for transmission of unpredictable samples and eight, 8 bit time slots $T_{25}$ thru $T_{32}$ occupied by a 64 sample assignment word (SAW). The SAW informs the receiver as to which of the 64 voice circuits the unpredictable samples $T_1$–$T_{24}$ belong.

As the comparisons are made at the transmitter the first comparison indicating an unpredictable sample results in that sample being placed in time slot $T_1$. If that sample is from voice circuit 3, for example, then the SAW will have 0 in its first and second bit slots and a 1 in the third bit slot. If the next voice circuit indicative of unpredictability is, for example, voice circuit 6, then that unpredictable sample will be placed in time slot $T_2$ and the SAW will have 0 bits in bit slots 4 and 5 and a 1 in bit slot 6. This operation continues until 64 comparisions have been made and the unpredictable samples placed in the available time slots $T_1$–$T_{24}$.

The receiver already has stored therein 64 voice samples which were transmitted during previous frames as unpredictable samples. When the receiver receives the presently transmitted information including the sample assignment word it then updates the corresponding 64 voice samples stored therein by substituting the unpredictable voice samples for the stored voice samples in accordance with the channel routing information provided by the SAW. The receiver is then in a position to properly reconstruct the present frame of all 64 voice samples.

The system is designed around the statistics of speech such that on the average in a system of 64 voice circuits of information only 24 voice circuits will be non-redundant. However, there will be times when there is non-redundancy, i.e., unpredictability, in more than 24 voice circuits thereby resulting in an overload condition for those circuits which number above the 24 time slots available for transmission on that particular frame. The system alleviates overload in two ways. First, if an unpredictable sample is not transmitted because time slots $T_1$ thru $T_{24}$ are filled the receiver utilizes the corresponding previous sample stored at the receiver for reconstruction of the unpredictable sample which couldn't be transmitted. Though the corresponding previous sample is being reconstructed as the unpredictable sample the fact is the corresponding previous sample stored at the receiver should be close in value to the unpredictable sample which couldn't be transmitted. Secondly, the subjective effects of overload are alleviated by effectively recirculating the servicing sequence. For example, during frame 1 the voice circuits are serviced at the transmitter in sequence from 1 to 64. During the next frame the voice circuits are effectively serviced in sequence starting with voice circuit 2; voice circuit 1 being the 64th circuit to be serviced; and so on. This recirculation of the servicing sequence continues so that in a period of 64 frames each circuit has had the opportunity to be serviced at each priority level (i.e. first to 64th). In this manner, if the system is operating under overload conditions the higher numbered circuits are not always serviced last since effectively those circuits become the lower numbered circuits on successive frames.

DETAILED DESCRIPTION OF THE DRAWING

Figure 1:
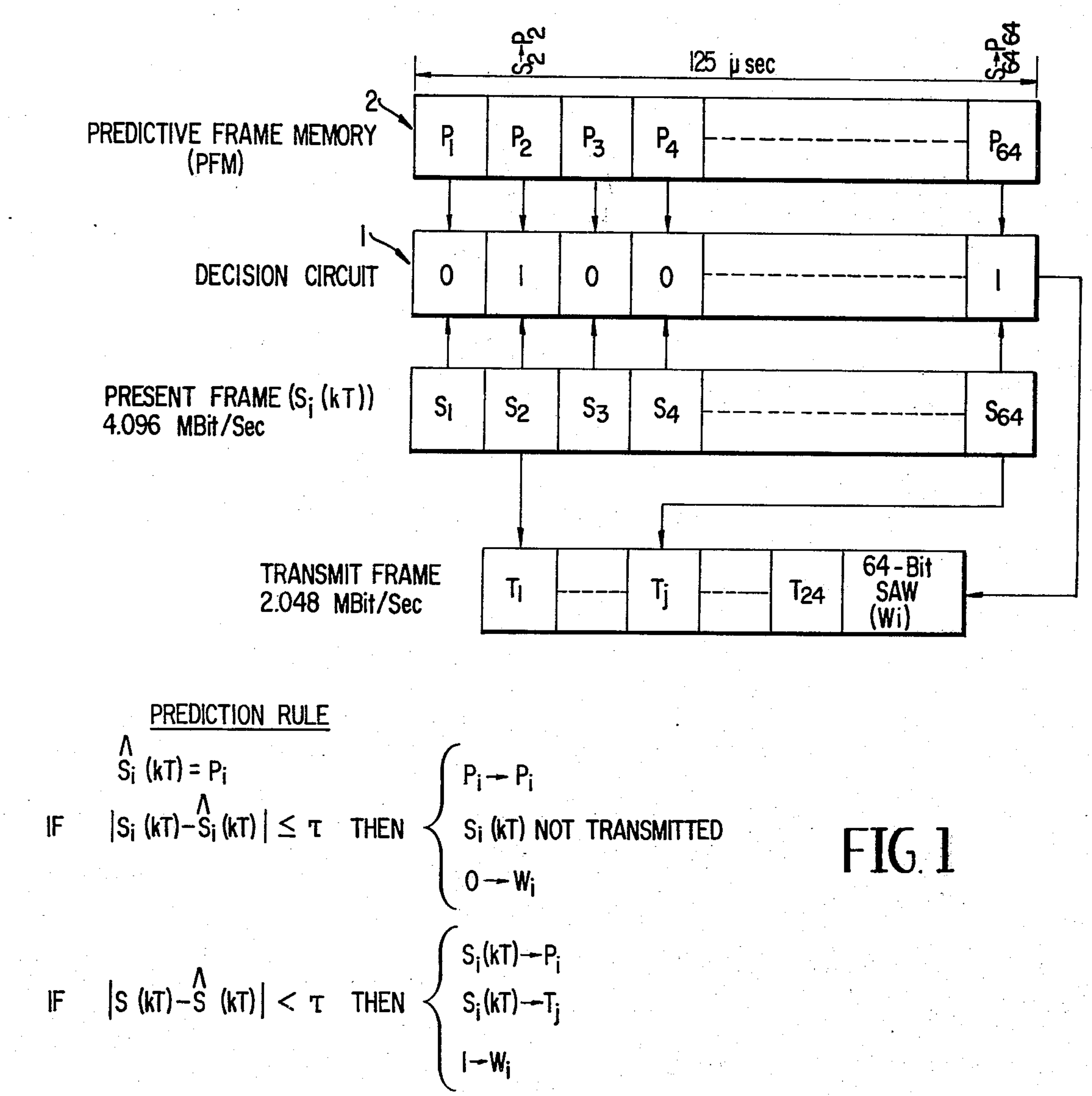
FIG. 1 is a diagram showing functionally the manner in which bit rate compression is achieved in a digital, multi-channel communications system using a redundancy removal scheme.

Referring to FIG. 1 there is shown functionally the manner in which bit rate compression is achieved in a digital, multichannel communications system using redundancy removal techniques. During one frame, $n$ voice circuits are sampled and each sample $S_i(kT)$, a present sample, is fed to a decision circuit 1 shared by all the voice circuits. In decision circuit 1 the present sample $S_i(kT)$ is compared with $\hat{S}_i(kT)$. $\hat{S}_i(kT)$ is set equal to $P_i$ which is the corresponding previous sample stored in predictive frame memory (PFM) 2. Upon comparison, if the difference between the present sample $S_i(kT)$ and the predictive value $\hat{S}_i(kT)$ is greater than a predetermined threshold $\tau$ it is an indication that the present sample $S_i(kT)$ cannot be adequately predicted from the corresponding value $\hat{S}_i(kT)$. Therefore, the present sample $S_i(kT)$ must be transmitted. The decision circuit 1 transfers the unpredictable, present sample $S_i(kT)$ to the $i$th location in the predictive frame memory 2 wherein $S_i(kt)$ replaces $P_i$. If the difference between $S_i(kt)$ and $\hat{S}_i(kt)$ is less than or equal to the predetermined threshold $\tau$ then $S_i(kt)$ need not be transmitted and the value $\hat{S}_i(kt) = P_i$ remains in PFM 2. The decision circuit 1 also generates a logic 1 for every unpredictable sample $S_i(kt)$. The series of 0 for every predictable sample $S_i(kt)$. The series of 1's and 0's comprises the sample assignment word (SAW) which is part of the frame of information to be transmitted. Each time a 1 is generated the associated unpredictable, present sample $S_i(kt)$ is placed in an available time slot $T_j$ of the transmission frame. The prediction rules are summarized as shown in FIG. 1.

After all $n$ voice circuits are processed, a frame of information comprising the unpredictable present samples and the SAW which identifies the voice circuits associated with the unpredictable, present samples is transmitted. At the receiver, as will be further described, the transmitted information is used to update a predictive frame memory (PFM) which provides a sample every 125 $\mu$sec. to reconstruct speech in each of the n voice circuits.

In the preferred embodiment of the present invention it is possible to transmit n voice circuits over $n/2$ channels. Assuming $n = 64$ wherein speech on each voice circuit is quantized into 8 bits the normal bit rate would be equal to $64 \times 8 \times 8$ khz (the Nyquist sampling rate) = 4096 kbits/sec. The present invention, however, utilzes only 24 time slots $T_1$–$T_{24}$ (8 bits each) of voice information plus eight time slots $T_{25}$–$T_{32}$ (8 bits each) for the SAW. The bit rate is then ½ of the normal rate or (24 + 8 time slots) × (8 bits/time slot) × 8 khz = 2048 kbits/sec. The 2:1 compression ratio is achieved by applying to each of the *n* channels the predictive encoding algorithm called a zero-order predictor, well known in the art, and described above.

Although the efficiency of this system relies upon the redundant qualities of speech, all of the trunks serviced by the present invention need not be voice circuits. The present invention would be operative to provide an efficient use of transmission capacity where a small percentage of the input trunks contained digital data. The transmission of digital data would be based on standard techniques known to the routiner.

Figure 6:
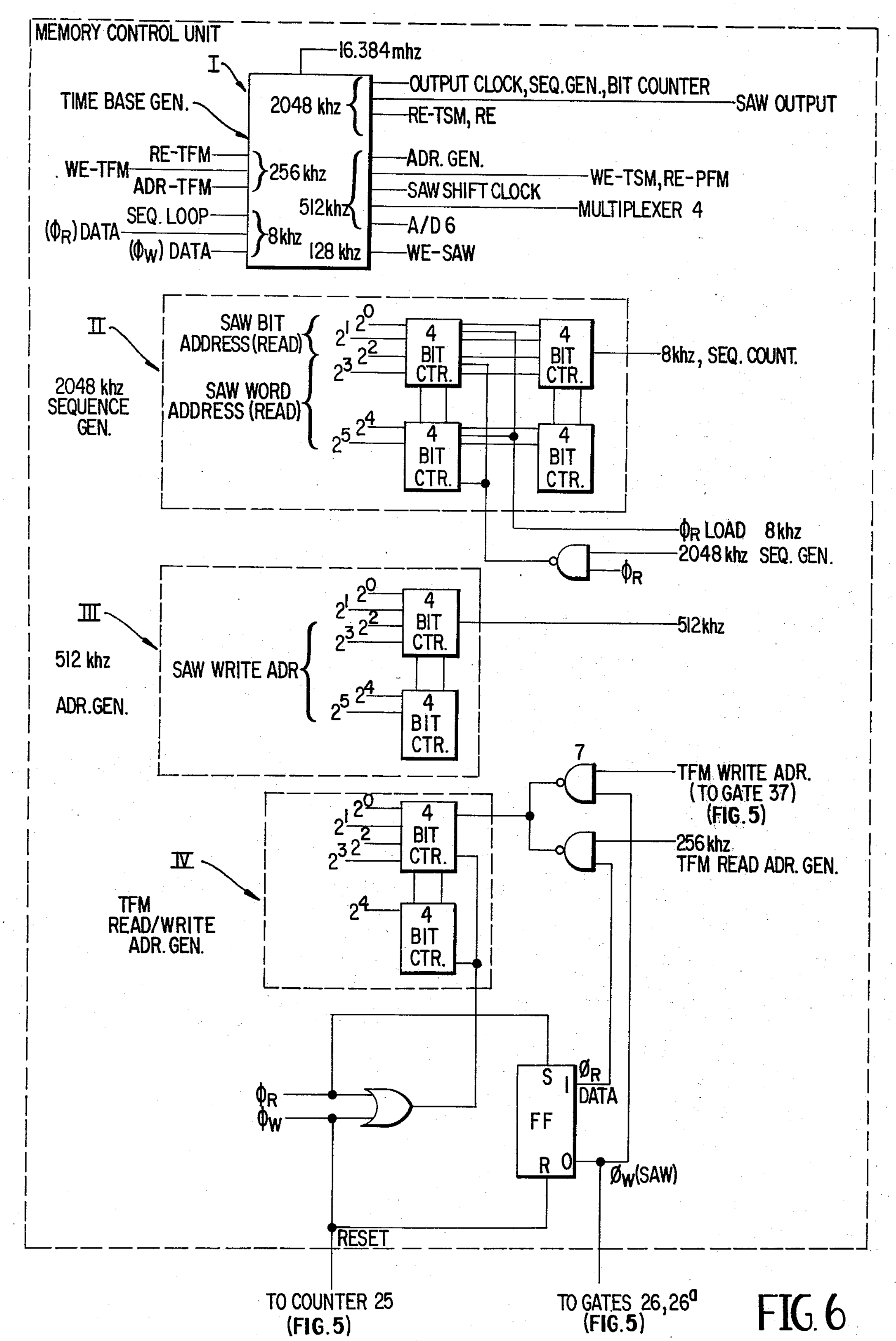
FIG. 6 is a schematic diagram of a memory control unit of the transmitter which provides the necessary timing and addressing functions for the transmitter.
Figure 10:
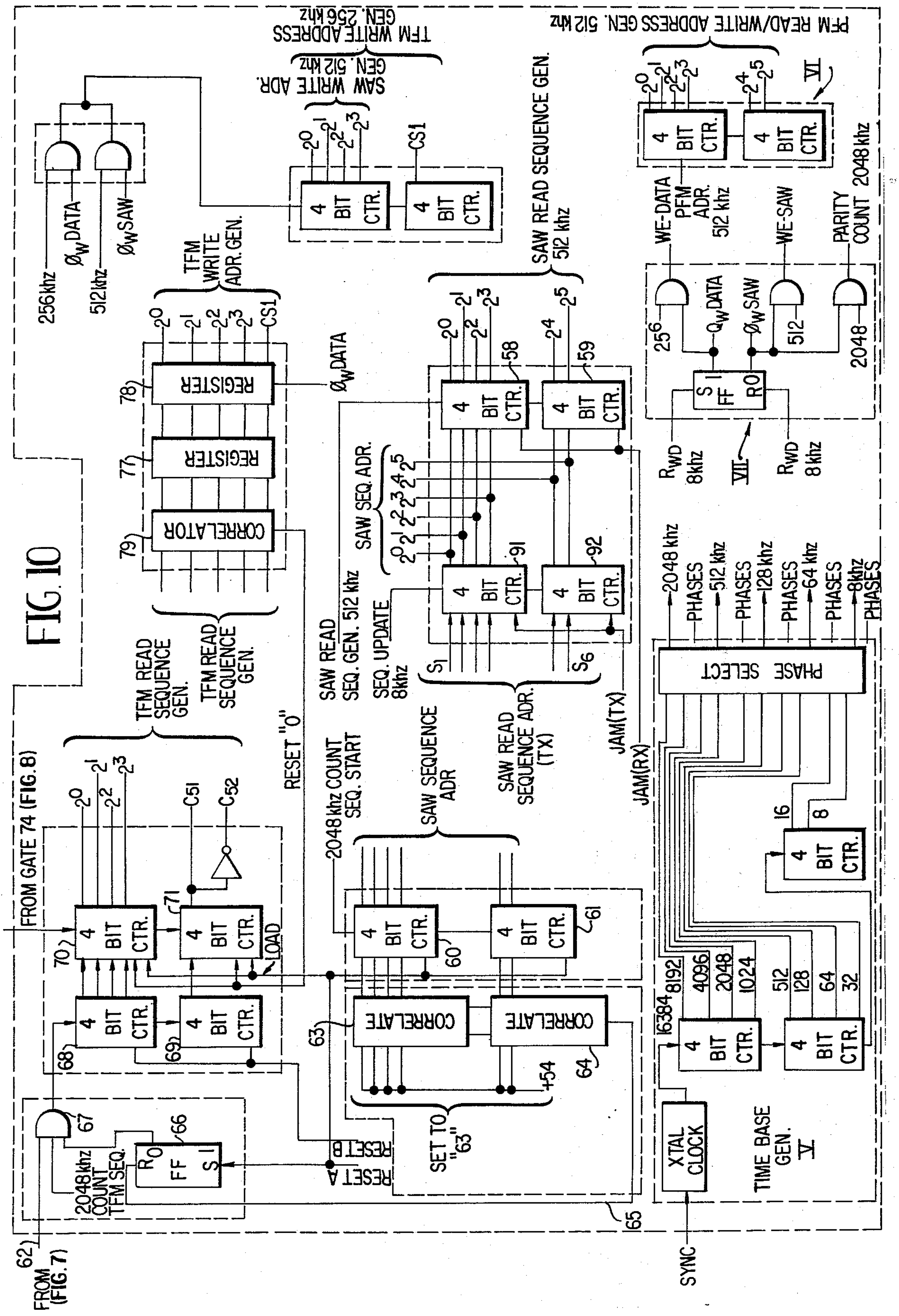
FIG. 10 is a schematic diagram of the memory control unit of the receiver which provides the necessary timing and addressing functions for all units of the receiver.

In continuing with a discussion of the present invention references will be made to FIGS. 6 and 10 of the drawings while discussing in detail other Figures of the drawings. FIG. 6 shows the memory control unit for the transmitter which provides the basic timing and addressing information. For example, there is shown in FIG. 6 a time base generator I which generates the necessary timing functions of the transmitter units. The abbreviations shown in the time base generator I and other units of the memory control unit will become apparent from the further discussion of the invention. For example, WE-TFM refers to write enable — transmit frame memory; RE-PFM refers to read enable — predictive frame memory. Also shown are groups II, III and IV of 4-bit counters which provide necessary addressing information for the transmitter units. For example, IV provides addressing information for the TFM (transmit frame memory) of the transmitter while II is the sequence generator. The individual units at the transmitter serviced by the several units of the memory control unit are appropriately referenced as to addressing information received and clocking periods of the addresses. The detail shown in FIG. 6 is given to enable one of ordinary skill in the art to more readily understand the timing and addressing functions required for the present invention, although it is to be understood that even without such detail one of ordinary skill would comprehend such timing and addressing functions upon reading the description of the preferred embodiments. The above is also true with respect to the memory control unit (FIG. 10) of the receiver. For example, the memory control unit has a time base generator V synchronized with time base generator I of FIG. 6 and a predictive frame memory (PFM) address generator VI which addresses the predictive frame memory of the receiver.

Figure 2:
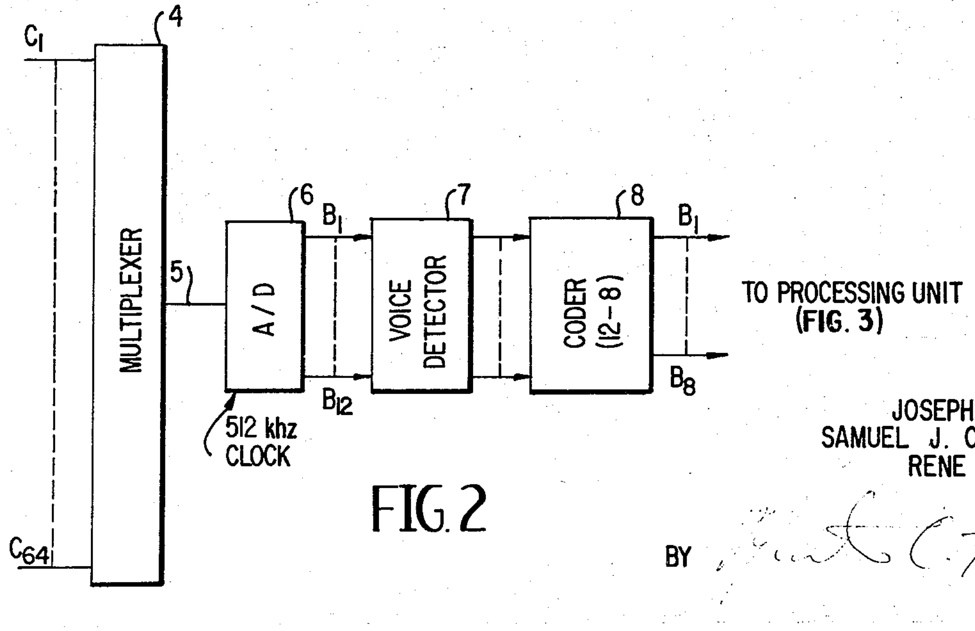
FIG. 2 is a block diagram of part of the equipment used at the transmitter

Referring to FIG. 2 there is shown a block diagram of part of the apparatus of the present invention used at the transmitter. A multiplexer 4, known in the art, receives analog voice information on 64 parallel voice circuits $C_1$–$C_{64}$ and multiplexes the information in a time series for transmission over line 5 to analog/digital converter 6. Analog/digital converter 6, which is a linear encoder, encodes the analog signal from each voice circuit $C_1$–$C_{64}$ into a digital code word $S_i(kt)$ (present sample) comprising 12 parallel bits $B_1$–$B_{12}$ at the clock rate of 64 × 8 khz = 512 hz. Each 12 bit, digital code word $S'_i(kt)$ is then fed to a digital voice detector 7 (shared by all circuits $C_1$–$C_{64}$) which is used to minimize the unnecessary transmission of noise. Digital voice detector 7 may be of a type described in patent application Ser. No. 19,184, entitled Method And Apparatus For Detecting Speech In the Presence of Noise, by Ettore Fariello and assigned to the asignee of the present invention. Actually, since the signals from the voice circuits are time division multiplexed the voice detector of the referenced application would be adapted for use in the present invention to have common voice detection circuitry for circuits $C_1$–$C_{64}$; however, there would be individual hangover time storage for each such voice circuit. Each digital code word is then fed to a 12/8 Digitally Linearizable Coder 8, known in the art, which compresses the 12 bit digital code word $S'_i(kt)$ to an 8 bit $B_1$–$B_8$ digital code word $S_i(kt)$. The conversion of the analog signal into a 12 bit digital code word by a linear encoder 6 companded to an 8 bit digital code word by coder 8 is required, as is well known, to obtain a desired companding characteristic.

Figure 3:
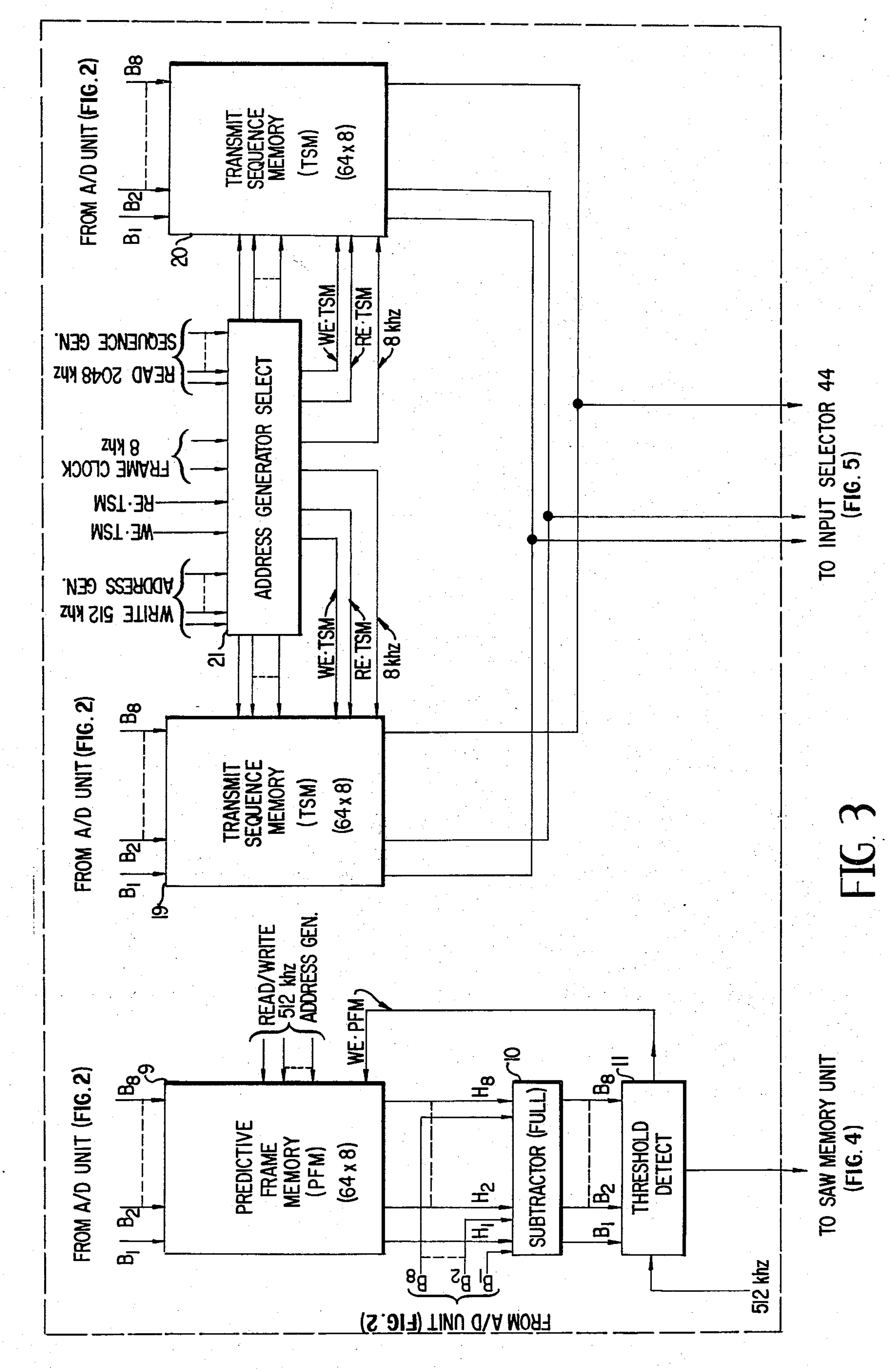
FIG. 3 is a schematic diagram of a processing unit for processing the digital signals at the transmitter.

Referring to FIG. 3, the 8-bit $B_1$–$B_8$ digital code word $S_i(kt)$ for each voice circuit $C_1$–$C_{64}$ is then fed as an input to predictive frame memory (PFM) 9 and to a full subtractor 10. Predictive frame memory 9 is a storage register having a capacity of 64 rows (one for each voice circuit $C_1$–$C_{64}$) with 8 bits/row. Full subtractor 10 digitally subtracts, in a manner well-known in the art, the digital code word of the present sample $S_i(kt)$ of the ith voice circuit from the digital code word representing the corresponding prediction $\hat{S}_i(kt) = P_i$ (the corresponding previous sample) comprising 8 bits $H_1$–$H_8$ stored in PFM 9. The corresponding prediction $\hat{S}_i(kt)$ is read out of PFM 9 by a 512 khz Read/Write address generator (shown in FIG. 6) synchronized with the time at which the corresponding present sample $S_i(kt)$ is fed to the full subtractor 10. The 512 khz Read/Write address generator generates a 6-bit digital code word which defines any one of the 64 rows in PFM 9. The output of full subtractor 10 is a digital code word $\delta$ comprising 8 bits $\delta_1$–$\delta_8$ which represents the difference in magnitude between the present sample $S_i(kt)$ and the corresponding prediction value $S_i(kt)$. The digital code word $\delta$ (i.e. "difference" code word) is then fed to threshold detector 11. If the difference code word $\delta$ is greater than a stored threshold $\tau$ threshold detector 11 generates a write enable (WE-PFM) pulse (a logic 1) which is fed to PFM 9 and to serial/-parallel converter 12 of the sample assignment word (SAW) memory of FIG. 4. The logic 1 enables PFM memory 9 to substitute the present sample $S_i(kt)$ for $P_i$ (contents of PFM 9) in the correct row defined by the 6-bit code word of 512 khz Read/Write address generator. If the difference code word $\delta$ is less than or equal to the threshold $\tau$ threshold detector 11 generates a logic 0 which is fed to serial/parallel converter 12 of the SAW memory of FIG. 4. However, the present sample $S_i(kt)$, being predictable under the predictive encoding algorithm, is not substituted in PFM 9 for $P_i$.

Figure 4:
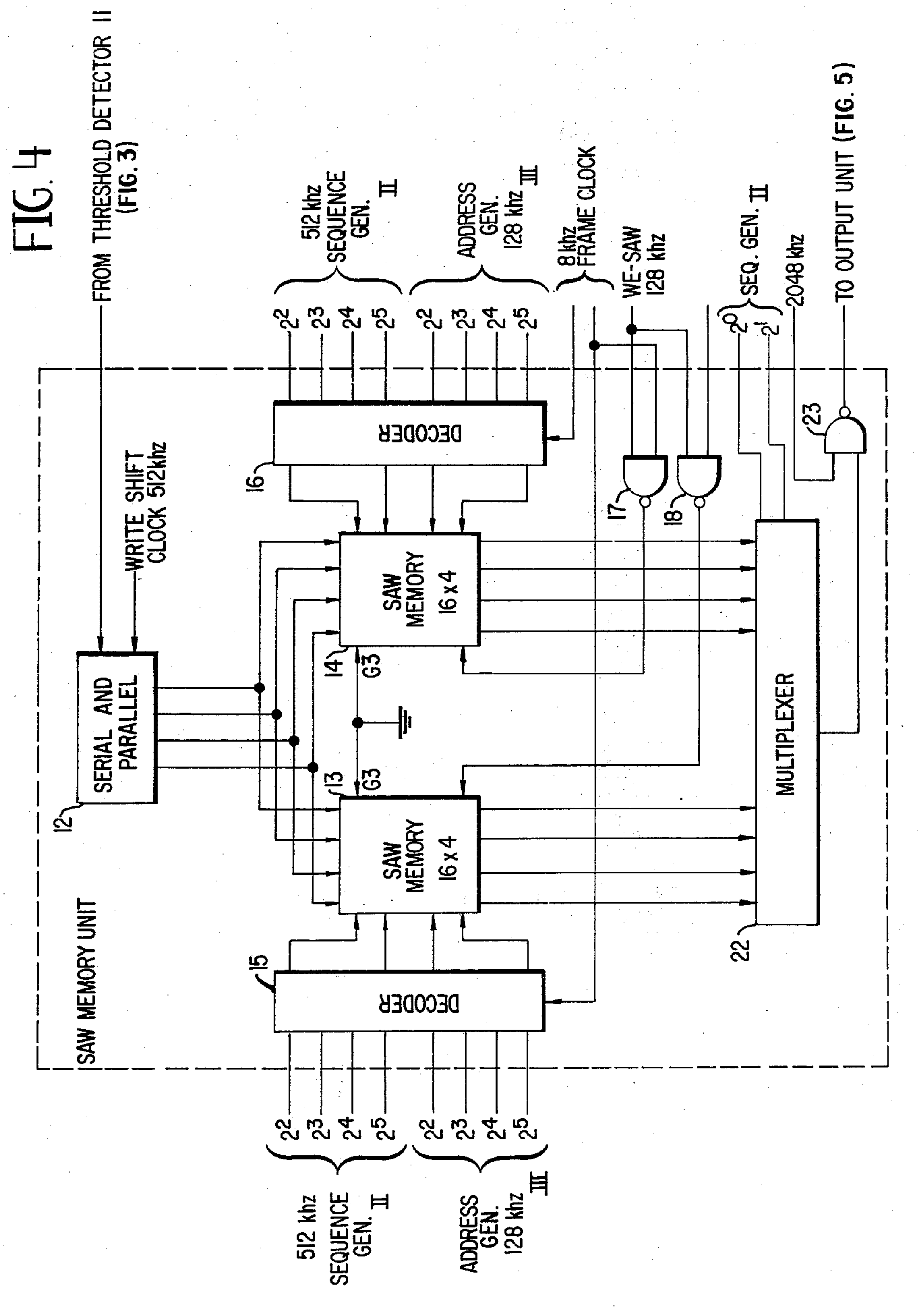
FIG. 4 is a schematic diagram of the sample assignment word (SAW) memory unit of the transmitter.

Referring to FIG. 4, as the 64 comparisons are made, one for each voice circuit sampled, the 64 logic 1's and 9's which comprise the SAW are converted, 4 bits at a time, from serial to parallel form by converter 12 and fed in parallel into one of two SAW memory units 13 or 14. SAW memory units 13 and 14 are storage memories having a capacity of 16 rows × 4 bits/row or 64 bits.

The SAW memory units 13 or 14 are enabled on alternate frame periods via respective decoders 15 and 16, by a 8 khz frame clock (see FIG. 6) and via gates 17 and 18, which are enabled every 128 khz by a write enable (WE-SAW) pulse, to write in the SAW associated with the present predictable and unpredictable voice samples for that frame. Decoders 15 and 16 decode a 4-bit word from the SAW word write address III (FIG. 6) which defines one of 16 rows for the SAW memories 13 and 14 whereby each group of 4 bits of the SAW is placed in a respective SAW memory. While one SAW memory, for example memory 13, is writing in the SAW of the present frame, the other is reading out the SAW of the previous frame.

While the present samples $S_i(kt)$ from voice circuits $C_1$–$C_{64}$ are being compared in full subtractor 10 with the contents $P_1$–$P_{64}$ of the PFM 9 the present samples $S_1(kt)$–$S_{64}(kt)$ are being written into one of the two transmit sequence memories (TSM) 19 or 20 of FIG. 3. Each TSM 19 or 20 is a storage memory having a capacity of 64 rows by 8 bits/row and is enabled to write-in the present samples during alternate frame periods (while the other memory is reading-out samples from previous frame) via an address generator select 21 by the 8 khz frame clock. Address generator select 21 is merely a set of switches which transfer the timing and address signals to the proper TSM 19 or 20, as would be well-known. There is therefore stored in TSM 19 or 20 all present samples $S_i(kt)$ from voice circuits $C_1$–$C_{64}$.

The manner in which the information to be transmitted, comprising 24 time slots for voice information and eight time slots for the SAW, is readied for transmission will now be described. In this discussion it is assumed the 64 present samples $S_i(kt)$ have been compared and stored (actually while the present samples are being compared and stored it is the unpredictable samples of the previous frame which are being readied for transmission). Assuming the SAW associated with the 64 present samples has been written into SAW memory 13 (while this was happening SAW memory 14 was reading out the SAW corresponding to the previous frame) it is now ready to output its contents. The row containing the first bit of the SAW to be read from the SAW memory 13 is defined by decoder 15. Decoder 15 receives from the sequence generator II (see FIG. 6), a 4-bit code word (the four most significant bits) defining one of the 16 rows in SAW memory 13 while multiplexer 22 receives a 2-bit code word (the two least significant bits) from the sequence generator which define where in the row the first bit to be outputted is located. For example, assuming during the third frame, the sequence, by which the SAW is read from SAW memory 13 starts with the bit corresponding to voice circuit $C_3$ the thereafter sequences in order through the other 63 bits (i.e., $C_4$, $C_5$, $C_6$, $C_{64}$, $C_1$, $C_2$). Decoder 15 would initially decode the 4-bit word corresponding to the row in SAW memory 13 in which is stored the bit associated with voice circuit $C_3$ and upon transfer of the row to multiplexer 22 the 2-bit word would define the position in the row where the bit associated with voice circuit $C_3$ is located.

Figure 5:
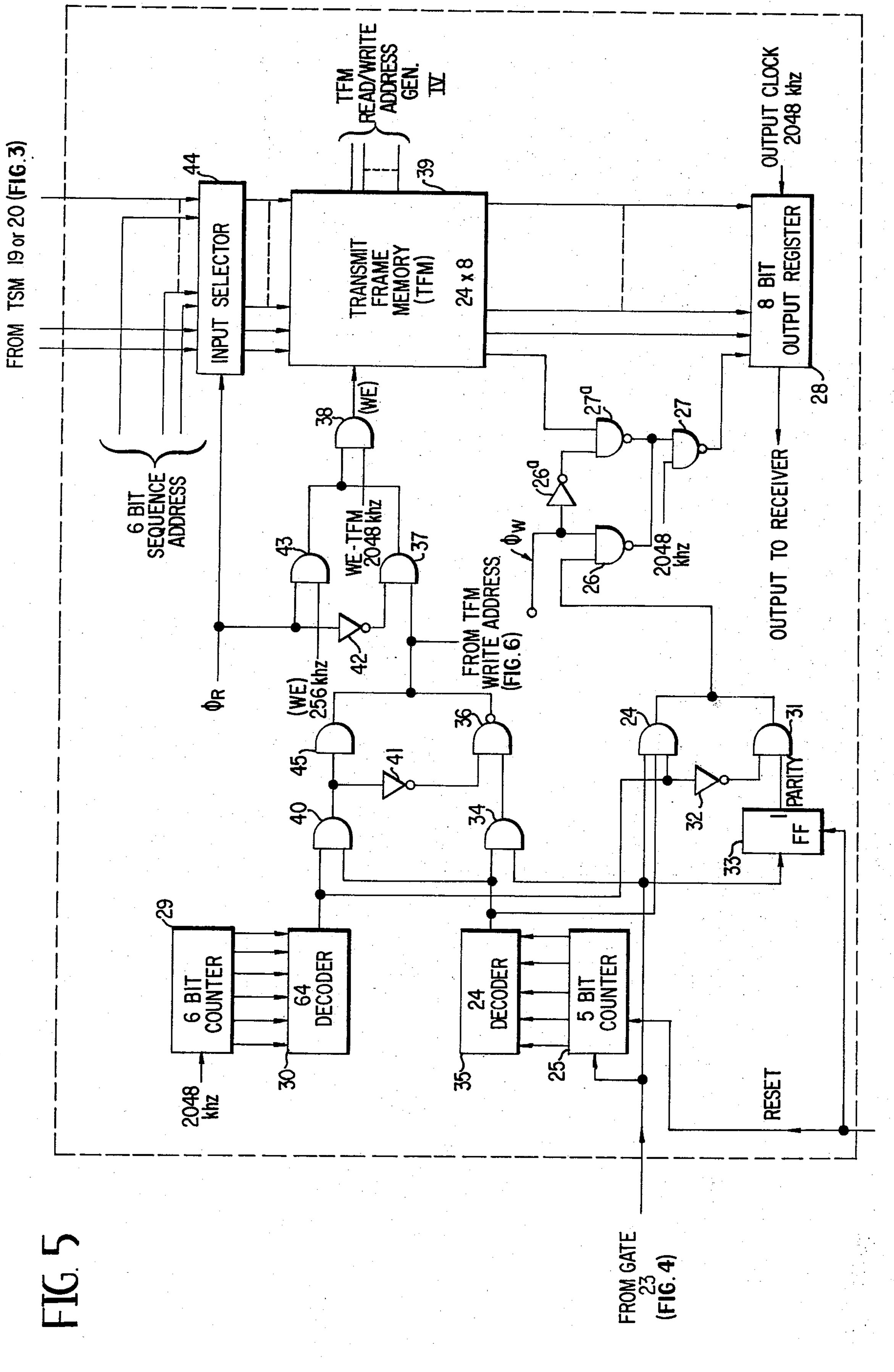
FIG. 5 is a schematic diagram of an output unit which develops the frame of information to be transmitted.

The SAW is clocked at a rate of 2048 khz via "AND" gate 23 to AND gate 24 and 5-bit counter 25 which comprise part of the output unit of FIG. 5. Gate 24 is enabled to pass the first 63 bits of the SAW via gates 26 and 27 to output resistor 28. A 6-bit counter 29 synchronized with the first bit of the SAW commences counting at the SAW bit rate (2048 khz) and when a count of 63 is reached a decoder 30 decodes the count 63. In response to the decoding of the count of 63, decoder 30 switches from logic 1 to logic 0 thereby inhibiting gate 24 and enabling gate 31 via inverter 32.

The function of gate 31 is to pass a parity bit as the 64th bit of the SAW, rather than passing the 64th bit of the SAW. A parity bit is generated from the first 63 bits of the SAW and used by the receiver to check for the occurrence of an odd number of errors in the SAW being received. The reason for a parity bit will be further discussed in relation to the receiver of the present invention. If it is predetermined that the SAW should always contain an even number of 1's then the receiver will expect to receive a SAW having an even number of 1's. The parity bit (i.e., 64th bit of the SAW) would then be a logic 1 if the first 63 bits contain an odd number of 1 bits. This is accomplished by feeding the SAW from gate 23 to flip-flop 33 which changes state each time a logic 1 passes through. If, at the 64th bit flip-flop 33 is at 1 then a decision is made that the parity bit is set equal to logic 1. If flip-flop 33 is at logic 0 then the parity bit is set to logic 0. The parity bit is passed through gates 26 and 27 via gate 31 to output register 28.

The SAW is also fed to AND gate 34 which is inhibited when decoder 35 has decoded a count of 24 from counter 25. Counter 25 receives the SAW and counts the number of 1s in it. Upon reaching a count of 24 counter 25 feeds a 5 bit number defining that count to decoder 35 for decoding. Until a count of 24 is reached the SAW is fed via gate 34 to gates 36, 37 and 38. Gate 38, if enabled, will pass a write enable (WE) pulse to transmit frame memory (TFM) 39 for each of the first 24 1's in the SAW.

Gates 34, 36, 37, and 38 will be enabled as follows. If the SAW contains a 1 and counter 25 has not reached a count of 24 then gate 34 will be enabled to pass the 1 bit. Then, if the counter 29 hasn't reached a count of 63 (indicating that this particular bit is part of the SAW associated with the information being prepared for transmission) gate 45 is not enabled and an enabling level via inverter 41 is fed to gate 36 enabling the 1 bit to pass. The 1 bit is then passed through gate 37 which receives its enabling level from inverter 42 when transmit frame memory (TFM) 39 is not in its read-out condition. The 1 bit is then fed to gate 38 which is enabled from gate 43 when the latter is receiving a write enable (WE) pulse which enables TFM 39 to write-in samples from TSM 19.

As the 64 bits of the SAW are fed to the output unit of FIG. 5 the TSM 19 receives the 6-bit code word from the sequence generator II (see FIG. 6) via address generator select 21. The 6-bit code word from the sequence generator II defines the row in which the voice sample corresponding to the first bit read-out of multiplexer 22 is situated. In the present example, the sequence generator II initially generates the 6-bit code word defining row 3 which corresponds to voice circuit $C_3$ thereafter followed in sequence by code words defining voice circuits $C_4$, $C_5$ . . . $C_{64}$, $C_1$, $C_2$. As the sequence generator enables, in sequence, each row, if a write enable (WE) pulse from gate 38 corresponding to a particular bit of the SAW representing the associated voice circuit enables TFM 39 then the sample in that row is transferred via input selector 44 to TFM 39. (Input selector 44 is a set of logic gates enabled to pass either the samples from TSM 19 or a code word defining the particular servicing sequence under consideration, as will be further described.) For example, if the first 5 bits (from left to right) of the SAW from multiplexer 22 are 00101 then that indicates (remembering the first bit corresponds to voice circuit $C_3$) that voice circuits $C_3$ and $C_4$ are predictable. When the first 1 bit casues a write enable (WE) pulse from gate 38 the sequence generator II will be enabling row five in the TSM 19 thereby resulting in the transfer of the sample in row five from TSM 19 to TFM 39. TFM 39 receives a 5-bit code word from TFM Read/Write Address Generator (FIG. 6) defining a row commencing with row one, in which to store the transferred samples and thereafter output them. This first unpredictable sample will then eventually be transmitted in time slot $T_1$ of the transmission frame. In a like manner when the second 1 bit of the SAW enables the TFM 39 the sample in row seven of the TSM 19 will be transferred to TFM 39 and eventually will appear in time slot $T_2$ of the transmission frame. In a like manner all unpredictable present samples are transferred to TFM 39. After all unpredictable samples are loaded in TFM 39 and the SAW fed to output register 28 the rows in TFM 39 are sequentially enabled by the TFM Read/Write address generator to output the samples on a row-by-row basis from the TFM 39 to output register 28 upon the enabling of gate 27*a* via inverter 26*a*. The output of output register 28 will then be, in series, 64 bits of the SAW followed by 24 time slots $T_1$–$T_{24}$ comprising the unpredictable samples which are then transmitted to a receiver.

Continuing with a discussion of the output unit of FIG. 5 assume that in a particular frame there are less than 24 voice circuits which are unpredictable. This means that not all of the transmission time slots $T_1$–$T_{24}$ will be filled. Advantage is taken of the available time slots to transmit therein the 6-bit sequence code word which defines the particular servicing sequence corresponding to the frame number. In the present example the 6-bit code word (plus two dummy bits to fill the 8-bit time slot) defining the sequence starting with voice circuit $C_3$ would be transmitted. The purpose of this, as will be hereinafter more fully explained, is to verify to the receiver the servicing sequence associated with the transmitted frame of information in case its sequence generator becomes unsynchronized with the sequence generator of the transmitter. Also in place of the two dummy bits mentioned above two parity check bits could be used to make a check at the receiver to determine if the sequence code word is being properly received. The parity check bit would be added as discussed previously with respect to the SAW parity check.

The manner in which the 6-bit sequence code word is added to the transmission frame is as follows. The condition under which the decision to transmit the sequence code word is that counter 25 has not reached a count of 24 (indicating there are less than 24 logic 1s in the SAW) whereas counter 29 has reached a count of 64 (indicating that the complete SAW has been counted). Under this condition none of the gates 34, 36, 37, 38, 40, 45 are enabled. As a result the 6-bit sequence code word generated by the sequence generator II is forced into the available rows in TFM 39 via input selector 44 and thereafter eventually occupies the available time slots of the transmission frame. (Actually, as noted above, two parity check bits are added to the sequence code word to provide an 8-bit word.)

Under overload conditions counter 25 has reached a count of 24 prior to counter 29 reaching a count of 64. Accordingly, at the count of 24 decoder 35 switches to logic 0 thereby disabling gate 34. As a result no further 1s is the SAW, which would cause gate 38 to emit a write enable (WE) pulse, are passed by gate 34 and the voice samples in TSM 19 associated with the latter 1s (i.e., beyond the 24th) cannot be transmitted. This condition results in an amplitude error due to overload since the receiver will use corresponding previous samples to reconstruct the unpredictable samples which couldn't be transmitted.

To alleviate sample (i.e., amplitude) error due to overload the servicing sequence is continuously being recirculated. That is, in the present example, the 6-bit sequence generator II started with a 6-bit sequence code word defining voice circuit $C_3$ and thereafter generated, in sequence, 63 — 6-bit code words defining voice circuits $C_4$, $C_5$ . . . $C_{64}$, $C_1$, $C_2$. During the next frame period the sequence generator is updated to start with a 6-bit sequence code word defining voice circuit $C_4$ and thereafter generate 63 — 6-bit code words defining voice circuits $C_5$, $C_6$ . . . $C_{64}$, $C_1$, $C_2$, $C_3$. As a result the first bit read from multiplexer 22 is the bit corresponding to voice circuit $C_4$ followed, in sequence, by the bits corresponding to the other voice circuits. In a like manner TSM 19 is addressed by the 6-bit sequence code word from sequence generator II starting with the row storing the voice sample from voice circuit $C_4$. In this manner recirculation of the voice circuits $C_1$–$C_{64}$ occurs such that each voice circuit $C_1$–$C_{64}$ effectively becomes the first voice circuit sampled every 64 frames.

Figure 7:
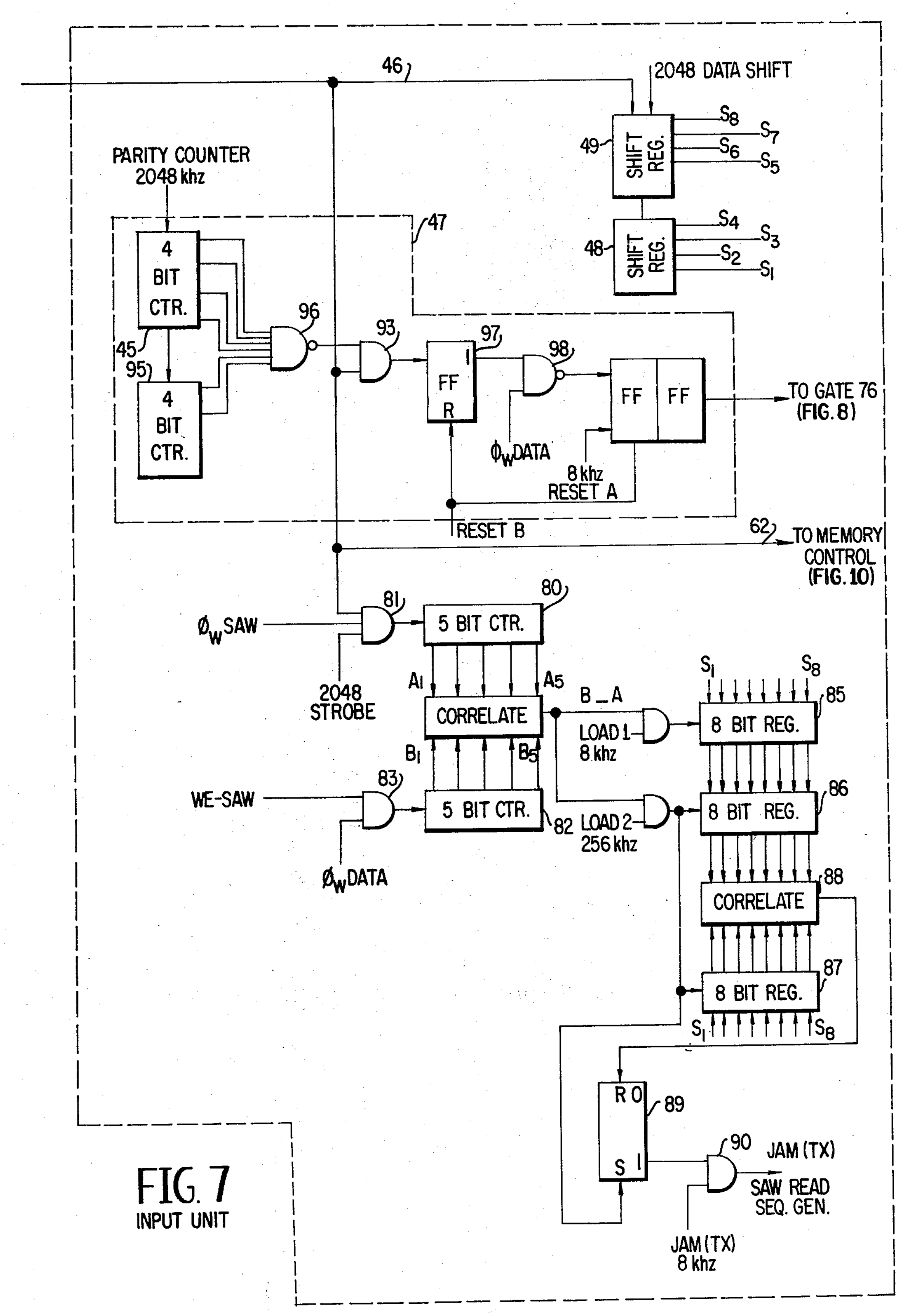
FIG. 7 is a schematic diagram of an input unit at the receiver which receives the frame of information transmitted.
Figure 8:
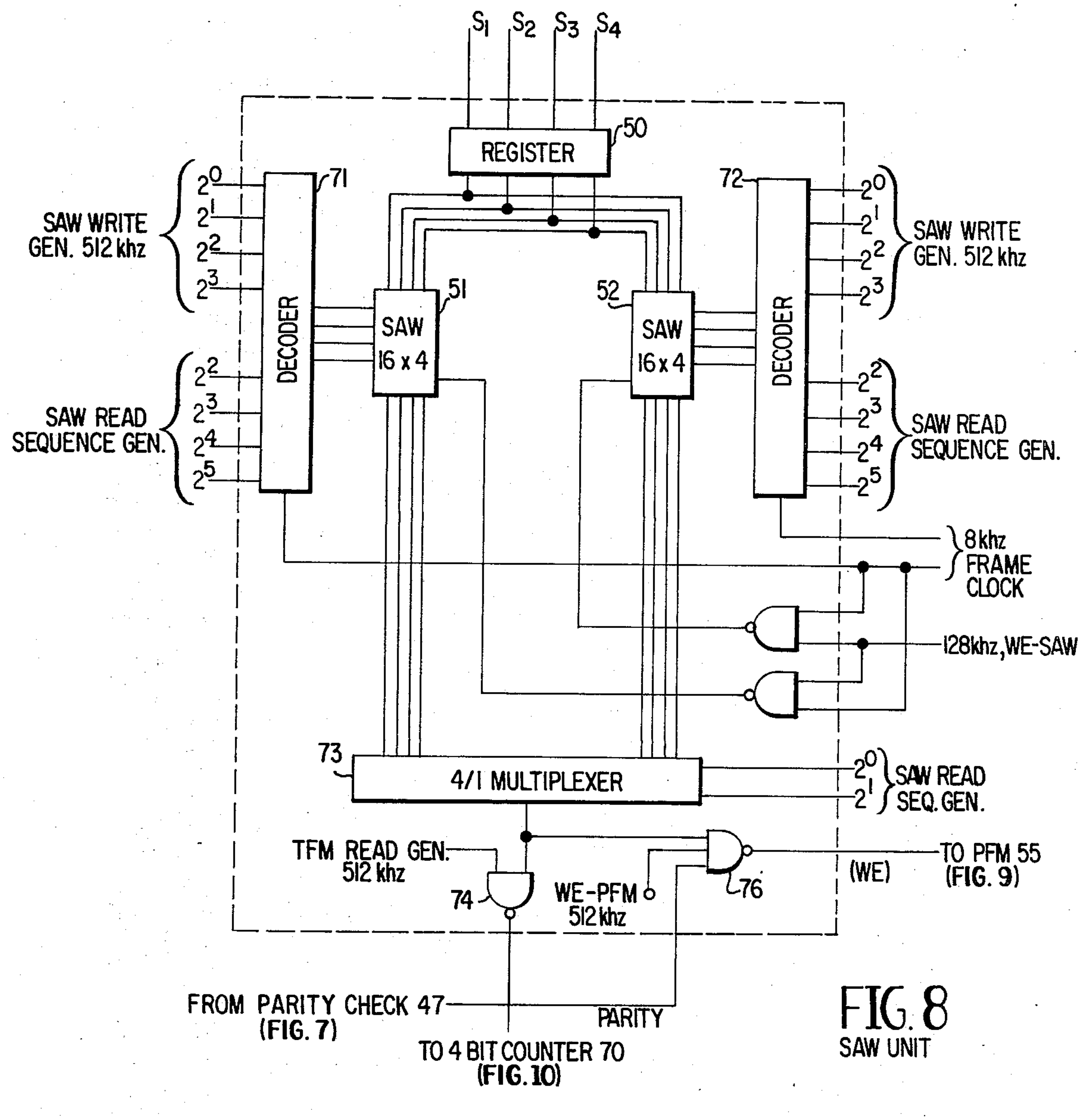
FIG. 8 is a schematic diagram of a sample assignment word (SAW) memory unit of the receiver.
Figure 11:
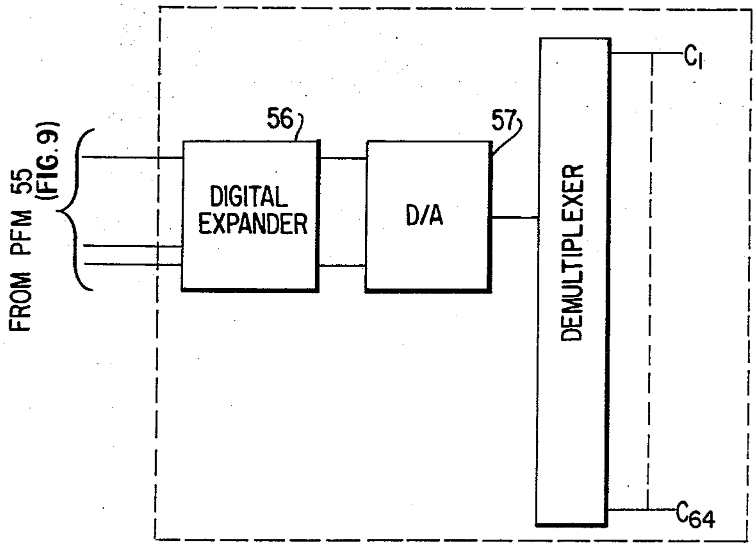
FIG. 11 is a block diagram of equipment used for the digital-to-analog conversion of the received signals.
Figure 9:
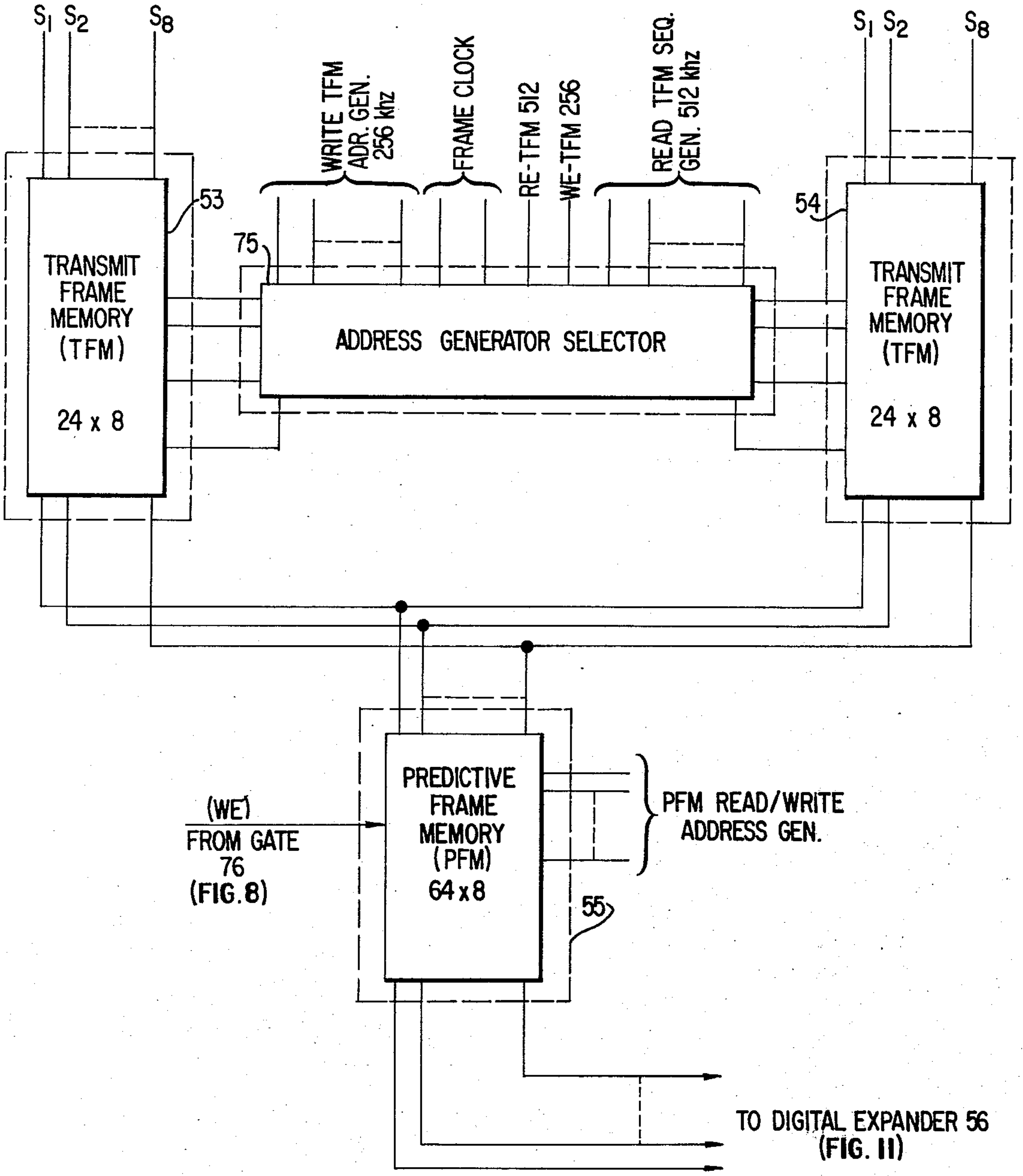
FIG. 9 is a schematic diagram of the processing unit of the receiver for processing the received digital signals.

Referring to FIG. 7 there is disclosed a schematic diagram of an input unit at the receiver which receives the frame of information transmitted. The received information comprising, in series, 64 bits of the SAW and 24 time slots $T_1$–$T_{24}$ of voice information is received on input line 46. The SAW is fed to parity check apparatus 47 and four-stage shift register 48. The SAW is shifted into shift register 48 from four-stage shift register 49. The SAW is then fed, 4 bits at a time, to shift register 50 (FIG. 8) where it is then transferred, 4 bits at a time, into one of two SAW memory units 51 or 52. As with the SAW memories 13 and 14 at the transmitter the SAw memory units 51 and 52 operate during alternate frame periods to write and read the SAW. During one frame, for example, while memory 51 is accepting the received SAW, memory 52 is outputting the previously received SAW. The operation of these memory units is controlled by the 8 kHz frame clock and the 128 khz write enable (WE-SAW) pulses from the memory control unit (FIG. 10). After the received SAW is stored in one of the memories, for example memory 51, the channels of information $T_1$–$T_{24}$ are received and transferred to the two 4-bit shift registers 48 and 49. Each received sample comprising eight bits is then shifted into one of two transmission frame memories (TFM) 53 or 54 (FIG. 9). As with the transmission sequence memories (TSM) 19 and 20 at the transmitter the transmission frame memories 53 and 54 operate during alternate frame periods to write and read the received code words in time slots $T_1$–$T_{24}$. Again during one frame period while, for example, TFM 53 is writing-in the received samples the previously received samples are being read from memory 54.

Assuming the presently received frame of information is stored in the respective SAW memory unit 52 and TFM 54 and a parity check (described later) has indicated that the received SAW was not corrupted by an odd number of errors, the manner in which the 64 voice circuits at the receiver are up-dated will now be described. In doing so, it should be noted that though there is an effective recirculation of the servicing sequence of the voice circuits at the transmitter the voice circuits $C_1$–$C_{64}$ are always initially sampled in a set sequence starting with voice circuit $C_1$ and sequencing through voice circuit $C_{64}$. Accordingly, the de-multiplexer at the receiver must also de-multiplex the updated frame of information of the 64 voice circuits starting with voice circuits $C_1$ and sequencing through voice circuit $C_{64}$. It is therefore necessary that predictive frame memory (PFM) 55 deliver the frame of information to the digital expander 56 and eventually to the digital-to-analog converter 57 in a set sequence starting with voice circuit $C_1$ and sequencing through the voice circuit $C_{64}$.

The TFM 54, which is a memory having 24 rows of 8 bits/row, receives and stores the transmitted samples $T_1$–$T_{24}$ in an order wherein the lowest active voice circuit relative to the particular sequence is stored. That is, continuing with the present example, sequence number 3 of the possible 64 sequences is transmitted. The transmitter has effectively selected for possible transmission voice circuit $C_3$ as the first voice circuit. If the first 5 bits of the SAW are 00101 (corresponding to $C_3$, $C_4$, $C_5$, $C_6$, $C_7$ . . . ), as previously mentioned, then the sample corresponding to voice circuit $C_5$ is the first unpredictable sample and will be located in time slot $T_1$ and, when received, will be stored in the first row of TFM 54. Accordingly, voice circuit $C_5$ will be the lowest active circuit relative to the sequence number 3. Thereafter, voice circuit $C_1$ may be the 22nd active circuit relative to the sequence number 3 and would be eventually stored in row 22 of TFM 54. It would then be necessary to transfer the unpredictable samples in TFM 54 to PFM 55 starting with the unpredictable sample corresponding to voice circuit $C_1$, placing that sample in the first row of PFM 55 followed in sequence by the active voice circuits in sequence number 3 subsequent to voice circuit $C_1$.

To be able to transfer the samples from TFM 54 to PFM 55 in a manner for proper reconstruction of the 64 voice circuits it is necessary to know for any sequence number 1 – 64 where (in the particular sequence under consideration) in the SAW the bit associated with voice circuit $C_1$ is located. If the transmitter is presently operating under sequence number 3 and the receiver knew that the particular sequence being received is sequence number 3 then it knows that the first bit received in the SAW corresponds to circuit $C_3$. The receiver can then determine that the 63rd bit in the received SAW will correspond to the to voice circuit $C_1$. If the received sequence was number 21 then the 45th bit in the received SAW would correspond to voice circuit $C_1$, and so on. Accordingly, in response to a clock synchronized with the reception of the first bit of the SAW, the two 4-bit counters 58 and 59 (the sequence generator of the receiver synchronized with the sequence generator of the transmitter) in the memory control unit of FIG. 10 emit a 6-bit code word representing the sequence number 3. The 6-bit code word representing sequence 3 is then fed to two 4-bit counters 60 and 61. These 4-bit counters 60 and 61 commence counting from number 3 at the SAW clock rate of 2048 khz at a time when the first bit of the SAW is being received over line 62. The output of 4-bit counters 60 and 61 is then correlated in correlators 63 and 64 which are set to the number 63. When the 4-bit counters 60 and 61 reach the count of 63 there is a correlation and the receiver then knows that in the next clock period the received SAW bit will be that corresponding to voice circuit $C_1$. When the count of 63 is reached a pulse is fed via line 65 to flip-flop 66. Flip-flop 66 then changes state inhibiting a gate 67 which has been previously enabled to pass all the bits of the received SAW starting with the first bit relating to voice circuit $C_3$ up to and including the bit relating to voice circuit $C_{64}$. While the gate 67 is passing the received sequence of SAW bits, the number of 1s being received are counted in 4-bit counters 68 and 69 which are equivalent to a 6-bit counter. When the gate 67 is disabled the 4-bit counters 68 and 69 have reached a count which indicates (assuming the count is 21) that the first 21 rows in the TFM 54 store unpredictable samples corresponding to 21 of the voice circuits from $C_3$ . . . $C_{64}$. This number 21 is then shifted into 4-bit counters 70 and 71.

While the foregoing is occurring the sequence generator (counters 58 and 59) has transferred a 4-bit code word (the four most significant bits of the sequence code word) to the decoder 72 (FIG. 8) and a 2-bit code word (the two least significant bits of the sequence code word) to multiplexer 73. As a result the bit relating to $C_1$ will be the first bit read from the multiplexer 73 followed in sequence by the remaining 63 bits of the SAW. When the 4-bit counters 70, 71 have stored therein the number (21) of active voice circuits from $C_3$–$C_{64}$ the SAW memory 52 and multiplexer 73 are enabled to emit the bit relating to voice circuit $C_1$. If this bit is, for example, a 1 then it is fed via gate 74 to the counters 70, 71 where it advances the count one number to 22. This number 22, which is fed to TFM 54 via the address generator selector 75 (similar to address generator select 21 at the transmitter), then defines row 22 in TFM 54 as the row containing the unpredictable sample corresponding to voice circuit $C_1$. The 1 from memory 52 is also fed via multiplexer 73 to predictive frame memory (PFM) 55 via gate 76 to serve as a write enable (WE) pulse. At the time the write enable (WE) pulse is received the PFM 55 has also received a code word from the PFM read-write address generator (see FIG. 10) which defines the first row of memory 55 which always stores the sample from voice circuit $C_1$. Accordingly, in response to the write enable pulse the 22nd row of TFM 54 containing an unpredictable sample from voice circuit $C_1$ is transferred from the TFM 54 to the first row of PFM 55. Thereafter, as the SAW memory 52 emits the SAW via gates 74 and 76, each time there is a 1 the counters 70 and 71 are advanced one number thereby advancing the TFM 54 to the row associated with that 1. Each time a bit (0 or 1) is emitted from SAW memory 52 and multiplexer 73 the PFM read-write address generator advances one number thereby defining the next row in PFM 55. Consequently, each time a 1 is emitted from SAW memory 52 the unpredictable sample in TFM 54 is properly transferred to the PFM 55 in a manner heretofore discussed wherein the unpredictable sample replaces the corresponding previous sample stored therein. In this manner the sampling sequence is "de-sequenced".

After the frame is analyzed and all the unpredictable samples are transferred to the PFM 55 the samples from voice circuit $C_1$–$C_{64}$ are sequenced out of PFM 55 and fed to digital expander 56. Digital expander 56, well-known in the art, expands each 8-bit sample to a 12-bit sample and transfers the sample to a digital-to-analog converter 57 wherein each sample is converted to analog form. Thereafter the analog samples are demultiplexed and fed to the proper receive circuits $C_1$–$C_{64}$.

If there is an underload condition then the number of voice samples written into the TFM 54 will be less than the capacity of TFM 54. Accordingly, it will not be necessary to transfer voice samples from the TFM 54 to the PFM 55 when the TFM read generator (counters 70, 71) has reached a number corresponding to the maximum number of samples stored therein. For example, if there were only 12 unpredictable samples in the transmitted frame then only the first 12 rows of TFM 54 will be filled with unpredictable samples. Accordingly, in de-sequencing the samples from TFM 54 to PFM 55, when the 12th row has been reached it would not be necessary to examine the remainder of the SAW for possible unpredictable samples. Upon reaching the highest numbered sample stored in an underload condition relative to the particular sequence the de-sequencing operation may cease since no more samples need be de-sequenced. The receiver does this by storing in register 77, which relates to TFM 54 (register 78 relates to TFM 53), the code word corresponding to the specific TFM write address defining the row in TFM 54 where the last sample to be transferred into TFM 54 is stored. This number is then fed to correlator 79 where it is correlated with the 5-bit code word from the two four-bit counters 70 and 71. When this latter number correlates with the code word from register 77 the receiver will known that the highest number sample relative to the sequence has been reached. In response thereto the correlator 79 will emit a re-set pulse which will cause the 4-bit counters 70, 71 to re-set.

Also noted in a discussion of the transmitter is that if there is an underload condition, the actual 6-bit sequence code word (plus 2 parity bits) defining the particular servicing sequence is transmitted in the unused channels. The purpose of this was to verify to the receiver the particular sequence being transmitted in the event that the sequence generator of the receiver might not be in synchronization with the sequence generator of the transmitter. Therefore, assuming an underload condition, the SAW, as it is received over line 46, is fed to a 5-bit counter 80 of FIG. 7 via gate 81 wherein 5-bit counter 80 counts the number of 1s in the SAW. Meanwhile, the 5-bit counter 82 via gate 83 counts the number of samples transferred into TFM 54 during the frame. If the number from counter 82 is greater than the number in counter 80 when correlated in correlator 84 then an underflow condition is indicated. In response to this condition the sequence code word which has been transmitted in a manner similar to the parity check made on the received SAW (later described) in several of the available time slots is first checked for parity and then fed to register 85 and then transferred to register 86 during the next clock period. During that next clock period the contents of the next time slot, which should be the same as the contents of register 86, is transferred to register 87. Then correlator 88 correlates these two code words and if they are the same it is an indication that the sequence code word transmitted without error. In response thereto flip-flop 89 changes state enabling gate 90 which causes the transmitted sequence code word to be jammed into counters 91 and 92 of the sequence generator for use as the receiver generated sequence code word. In this manner the receiver is insured that it is de-sequencing the particular frame under the right sequence.

A parity check is made at the input unit of the receiver to determine if an even number of 1 bits in the SAW is being received. If the parity check indicates there is an even number of 1's then the receiver is allowed to process the received unpredictable samples associated with that SAW to enable reconstruction of the voice samples in the frame. However, if the parity check indicates that an odd number of 1's in the SAW has been received (due, for example, to the corruption of one of the bits in the SAW by channel noise) then the receiver is not allowed to process the unpredictable samples since the channel routing information provided by the SAW is incorrect. Instead, the receiver reconstructs the samples already stored in PFM 55 without updating those samples with the received unpredictable samples. This will result in an amplitude error, however, this error will be slight since the samples which should have been updated will close in value to their corresponding unpredictable samples.

To make a parity check, as the SAW is being received each time a 1 appears gate 93 is enabled via an enabling level from 4-bit counters 94, 95 and gate 96. Each time gate 93 is enabled the flip-flop 97 changes state. If after the entire SAW is received flip-flop 97 is in the state indicating a parity check then an enabling level via gate 98 is fed to one of two flip-flops 99, 100 (there being one flip-flop associated with TFM 53 and one associated with TFM 54) which outputs an enabling level to gate 76 thereby enabling the substitution of unpredictable samples in PFM 55. If a parity check is not indicated then gate 76 does not receive an enabling level and the unpredictable samples transmitted with the SAW are not processed.

As described herein the present invention employs recirculation of the service priorities each frame in order to uniformly distribute the amplitude error due to overload. This feature of the invention is accomplished by sequencing the sample assignment priorities at the transmitter and "de-sequencing" the sample assignment at the receiver. The transmitter updates the starting circuit number in the sequence by one count every frame. The receiver makes use of this fact by also updating its starting circuit number by one count every frame.

An alternate method of accomplishing the recirculation feature of the present invention is to perform both the sequencing and de-sequencing operations at the transmitter. That is, the service priorities are sequenced as previously described. However, before the output frame is transmitted, both the sample assignment word and the transmitted samples ($T_1$ thru $T_{24}$) are de-sequenced so that the receiver always receives the SAW in the correct order (i.e. 1, 2, . . . 64) and the sample $T_1$ always corresponds to the lowest order active circuit relative to Circuit $C_1$.

The implementation of de-sequencing at the transmitter would require a TSM(A) connected to a TFM(A) and a SAW memory ($A_1$) associated with TSM(A) and a SAW memory ($A_2$) associated with TFM(A) as well as a TSM(B) connected to a TFM(B)

and a SAW memory ($B_1$) associated with TSM(B) and a SAW memory ($B_2$) associated with TFM(B).

De-sequencing at the transmitter would occur in the following manner. During a given frame the samples from circuits $C_1$–$C_{64}$ would be written into TSM(A) in order from $C_1$–$C_{64}$. While this is occurring the samples from the previous frame (which are already stored in TSM(B) in order from $C_1$–$C_{64}$) are operated on wherein the unpredictable samples are transferred from TSM(B) to TFM(B) in accordance with the particular servicing sequence associated with that frame so that TFM(B) has stored therein the unpredictable samples with the sample from the lowest active circuit relative to the servicing sequence stored in the first row. The manner in which the transfer is made from TSM(B) to TFM(B) is similar to the previously described method of transferring samples from TSM 20 to TFM 39.

While the above transfer from TSM(B) to TFM(B) is occurring the TFM(A) is being de-sequenced. TFM(A) (which has the samples of the next previous frame starting with the sample from the lowest active circuit relative to the servicing sequence already stored therein) is addressed starting with the lowest active circuit relative to circuit $C_1$ so that the time slots $T_1$–$T_{24}$ comrise unpredictable samples wherein time slot $T_1$ has the sample from the lowest active circuit relative to circuit $C_1$. The SAW which is stored in SAW(A) would output as its first bit the bit relating to circuit $C_1$ followed in sequence with the bits relating to circuits $C_2$–$C_{64}$. The manner in which the bit associated with circuit $C_1$ is located would be similar to that disclosed for the de-sequencing operation at the receiver. The transmission frame would now be de-sequenced and comprise, in order, the SAW having a series of bits associated respectively with circuits $C_1$–$C_{64}$, followed by time slots $T_1$–$T_{24}$ wherein $T_1$ comprises the lowest active circuit relative to circuit $C_1$, $T_2$ comprises the next active circuit relative to circuit $C_1$, and so on.

With the de-sequencing at the transmitter there would be significant simplifications in the memory control units in both the transmitter and receiver. The reason for this is that since there are less operations occurring simultaneously but rather over several frame periods (the transmission frame comprises unpredictable samples two frame periods removed from the present servicing frame) duplicate memory controls at the transmitter and at the receiver are not necessary to perform the simultaneous operations.

It should also be noted that though the receiver will automatically know where in the SAW the bit relating to circuit $C_1$ appears the parity bit will occupy any one of 64 positions in the SAW over a 64 frame period. The receiver though, would be able to locate the position of the parity bit in the SAW as it was able to locate the position of the bit relating to circuit $C_1$ when de-sequencing occurred at the receiver. In this manner a parity check may be made to determine if the correct SAW has been received.

What is claimed is:

1. In a digital communications system wherein information from a maximum number (M) of voice circuits at a transmitting station may be transmitted to a receiving station via a transmission path of given power level, bit rate and bandwidth, apparatus for enable the transmission of information from a number (N) greater than said maximum number (M) of voice circuits over said transmission path comprising:

a. means at said transmitting station for periodically sampling the amplitude of voice signals on each circuit of said N voice circuits;

b. means for comparing for each of said N circuits, a present amplitude sample with a prior amplitude sample which had been transmitted to said receiving station, said comparing means generating N signals in response to said comparisons and storing said N signals as a control word;

c. means for generating a transmission frame comprising a digital representation of those present amplitude samples which differ from the corresponding prior amplitude samples by a predetermined amount and said control word from said comparing means.

2. The apparatus of claim 1 further including voice detector means, connected to said sampling means, for detecting speech in the presence of noise.

3. The apparatus of claim 2 wherein the servicing sequence of said sampling means is changed such that, periodically, a different voice circuit is the first circuit sampled.

4. In a digital communications system wherein information from a plurality of voice circuits (N) at a transmitting station may be transmitted at a minimum bit rate to a receiving station via a transmission path, apparatus to enable the transmission of information from said N voice circuits over a transmission path at less than said minimum bit rate comprising:

a. means for sampling and digitally encoding, at least once each of successive sampling frames, the amplitude of the analog signal in each of said N voice circuits;

b. means for digitally comparing the encoded amplitude samples on said N circuits during a present sampling frame with corresponding encoded amplitude samples on said N circuits during a prior sampling frame and for generating for each frame a signal identifying each comparison and storing said signals as a single control word;

c. means for generating a frame of information for transmission to said receiving station comprising a first group of digital signals representing the amplitude of those present samples which differ from the corresponding prior samples by a predetermined amount and a second group of digital signals comprising said control word.

5. The apparatus of claim 4 including means for substituting, when required for parity, a parity signal as one of said second group of digital signals.

6. The apparatus of claim 5 further including means for periodically changing the order by which all circuits are serviced during successive transmission frames.

7. The apparatus of claim 6 further comprising means for generating, as part of a transmission frame, a digital code word representing the particular voice circuit servicing sequence.

8. In a digital communications system wherein information from a plurality of N voice circuits at a transmitting station may be transmitted to a receiving station via a transmission path, wherein each of the N voice circuits is sampled at the Nyquist sampling rate at least once during each of successive sampling frame periods, wherein each of the resultant samples are encoded into digital signals and wherein the transmission path requires a minimum bit rate to transmit all of said digital signals for a given voice transmission quality, apparatus to enable the digital transmission at said given voice quality of either said information from said N voice circuits over a transmission path at less than said minimum bit rate, or information from more than said N voice circuits over said transmission path at said minimum bit rate comprising:

a. a first storage means at the transmitting station for storing, for each voice circuit, said digitally encoded samples from a prior sampling frame;

b. means, connected to said first storage means, for digitally comparing the sample from each respective voice circuit for a present sampling frame with the sample stored in the first storage means for such respective voice circuit and for providing an identifying signal for each comparison representing the particular voice circuit whose sample is being compared;

c. means for assembling and transmitting a digitally encoded transmission frame of information comprising said identifying signals and signals representing those present samples which differ from corresponding prior samples by a predetermined amount;

d. means at the receiver for receiving said digitally encoded transmission frame;

e. a second storage means for storing for each voice circuit previously transmitted, digitally encoded samples from a prior sampling frame; and f. means connected to said receiving means for substituting for the samples stored in the second storage means, respective transmitted present samples in accordance with said identifying signals.

9. The apparatus of claim 8 further including apparatus, at a receiver, for reconstructing the samples in the present frame, comprising means for converting into analog form, for each transmission frame, the samples stored in said second storage means including the samples that were substituted into the storage means for said frame.

10. The apparatus of claim 9 further including a voice detector, at the transmitter, which detects speech in the presence of noise.

11. The apparatus of claim 9 further including:

a. means, at the transmitter, for substituting a parity check signals for one of said identifying signals;

b. means, at the receiver, for making a parity check on the received identifying signal; and c. means for reconstructing the previously transmitted samples stored in the second storage means as the present sampling frame of information when the parity check indicates an incorrectly received identifying signal.

12. The apparatus of claim 11 further comprising:

a. sequence generating means, at the transmitter and the receiver, for respectively generating a digital code word identifying the sequence in which each of the voice circuits are to be serviced;

b. means for transmitting the sequence identifying code word generated at the transmitter as part of the transmission frame;

c. means, at the receiver, for checking to determine if the received sequence identifying code word is being received correctly; and d. means for utilizing the received sequence identifying code word in place of the sequence identifying code word generated at the receiver when reception of the proper sequence identifying code word is indicated.

13. The apparatus of claim 9 including means for varying the order in which the plurality voice circuits are sampled for each of successive transmission frames comprising:

a. third storage means for digitally storing the identifying signal for each comparison in a present frame;

b. fourth storage means for digitally storing all of the samples of a present frame;

c. fifth storage means for digitally storing those present samples which are to be transmitted;

d. sequence generating means for generating a digital code word identifying the order in which each of the voice circuits is to be serviced;

e. means, responsive to the digital code word identifying the servicing order, for enabling the third and fourth storage means, respectively, to read-out the contents of the third storage means commencing with the signal corresponding to the voice circuit which is to be serviced first and to read-out the contents of the fourth storage means commencing with the sample corresponding to that voice circuit which is to be serviced first; and f. means for transferring, from the fourth storage means to the fifth storage means, in accordance with the signals read out from the third storage means, those present samples which are to be transmitted.

14. The apparatus of claim 13 wherein said means for substituting comprises:

a. sixth storage means for digitally storing the transmitted samples;

b. means for determining where in the received identifying signals the identifying signal relating to the first sampled voice circuit is located;

c. means for identifying the location in the sixth storage means of the sample from the lowest active channel relative to the first sampled voice circuit; and d. means for transferring the samples stored in the sixth storage means to the second storage means commencing with the sample from the lowest active channel.

15. The apparatus of claim 14 wherein said means for determining the location, in the sample assignment word, of the first signal comprises:

a. sequence generating means for generating a digital code word representing the servicing sequence for the present sampling frame; and b. means, synchronized with the signal in the sample assignment word representing the first voice circuit serviced in the present sampling frame, for counting to a number representing the total number of plurality of voice circuits commencing with the number represented by the servicing sequence digital code word.

16. The apparatus of claim 14 wherein said means for substituting further includes:

a. means for determining the location in the sixth storage means containing the last transmitted sample; and b. means for continuing the substitution of samples from the sixth storage means to the second storage means after substituting the last transmitted sample, commencing with the first transmitted sample, without investigating other locations in the sixth storage means for samples that could have been stored in such other locations if transmitted.

* * * * *